United States Patent [19]

Tollefson

[11] Patent Number: 4,648,563
[45] Date of Patent: Mar. 10, 1987

[54] LEAF-SPRING ROLLER GUIDE
[75] Inventor: Dale T. Tollefson, Woodbury, Minn.
[73] Assignee: Minnesota Mining and Manufacturing Company, St. Paul, Minn.
[21] Appl. No.: 690,467
[22] Filed: Jan. 10, 1985
[51] Int. Cl.⁴ .................... B65H 27/00; G11B 23/087
[52] U.S. Cl. ..................................... 242/76; 226/191; 226/194; 242/199
[58] Field of Search .................... 242/76, 71, 197–200, 242/118.32; 360/132, 137; 226/190, 191, 194, 196, 199

[56] References Cited
U.S. PATENT DOCUMENTS

| | | | |
|---|---|---|---|
| 3,066,884 | 12/1962 | Rehn | 242/71 |
| 3,829,040 | 8/1974 | Nelson | 242/199 |
| 3,889,900 | 6/1975 | Nelson | 242/199 |
| 3,891,159 | 6/1975 | Nelson | 242/199 |
| 3,991,956 | 11/1976 | Machida | 242/199 |
| 4,228,940 | 10/1980 | Umehara | 242/76 X |
| 4,313,551 | 2/1982 | Umehara | 242/76 X |
| 4,429,823 | 2/1984 | Umehara | 242/76 X |
| 4,437,222 | 3/1984 | Umehara | 242/76 |
| 4,518,134 | 5/1985 | Oishi et al. | 242/199 |
| 4,558,387 | 12/1985 | Shiba et al. | 360/132 |

FOREIGN PATENT DOCUMENTS

| | | |
|---|---|---|
| 2431969 | 2/1975 | Fed. Rep. of Germany . |
| 2501866 | 7/1975 | Fed. Rep. of Germany . |
| 2840069 | 3/1979 | Fed. Rep. of Germany . |
| 3143809 | 5/1983 | Fed. Rep. of Germany . |
| 3425401 | 1/1985 | Fed. Rep. of Germany . |

Primary Examiner—John M. Jillions
Attorney, Agent, or Firm—Donald M. Sell; James A. Smith; David W. Anderson

[57] ABSTRACT

One-piece plastic roller guide having a tubular body and two sets of three leaf springs projecting symmetrically from the root of the tubular body in opposite axial directions. At the free end of each set of leaf springs, the inner diameter of the roller guide is slightly less than the diameter of the fixed cylindrical pin on which it is mounted. This slight interference between the springs and the pin assures continuous contact between the roller guide and pin without unduly inhibiting rotation.

16 Claims, 3 Drawing Figures

LEAF-SPRING ROLLER GUIDE

FIELD OF THE INVENTION

The invention concerns a roller guide such as the takeup roller of a videotape cassette.

BACKGROUND ART

Both "Betamax" and "VHS" videotape cassettes include a takeup roller which typically is an injection-molded plastic sleeve rotatably mounted on a fixed, machined stainless steel pin. Because it is impractical in large-scale molding of the plastic sleeve to maintain an exacting inner diameter, rotation of the plastic sleeve would often create undue mechanical noise unless a heavy grease were applied to the stainless steel pin. The use of grease not only involves a contamination problem, but a significant proportion of videotape cassettes must be rejected because the takeup roller is either overgreased or undergreased.

Even though stainless steel can be virtually nonmagnetic, such a pin may be sufficiently magnetic to cause slight degradation of signals in magnetic recording tape moving across a plastic sleeve which is rotatably mounted on the pin. Accordingly, a plastic pin would be preferred, but even if the pin were machined after being molded, it would increase the range of clearances between the plastic sleeve and its pin and hence would result in a higher rejection rate due to under or overgreasing. On the other hand, if the steel pin could be replaced by a molded plastic pin without exacerbating such problems, the cost of the roller-pin assembly could be substantially reduced.

DISCLOSURE OF INVENTION

The invention concerns a roller guide which can be used as the takeup roller of a videotape cassette and, in such use, need not generate more mechanical noise when ungreased than do prior takeup rollers when greased. Furthermore, a preferred roller guide of the invention when mounted on a molded plastic pin without grease generates no more mechanical noise than do prior takeup rollers on greased, machined stainless steel pins. Briefly, the novel one-piece plastic roller guide comprises a tubular body having a substantially cylindrical outer surface, said body including a root from which at least one leaf spring projects in an axial direction such that the inner diameter of the roller guide at the free end of the leaf spring is smaller than its inner diameter at the root.

In a preferred molded plastic roller guide of the invention, the root has a substantially cylindrical inner surface which is coaxial with said substantially cylindrical outer surface, and two sets of three leaf springs project symmetrically in opposite axial directions from the inner diameter of the root. The leaf springs are centered at intervals of 120° with respect to the inner surface of the root.

The root is preferably of limited axial length where it intersects the tubular body of the roller guide, thus avoiding a sink area in the outer surface. Preferably that axial length does not exceed one-tenth the length of the roller guide and is less than 1.5 mm in the roller guide of a Betamax or VHS videotape cassette, the specifications of which call for a roller guide length of about 17 mm.

Preferably at the base of each spring is a gusset which reinforces the spring. When a roller guide having two sets of three leaf springs with such reinforcing gussets is molded of a thermoplastic resin in a 2-piece injection mold having a cylindrical core pin, shrinkage of the thermoplastic resin upon cooling inherently causes the free ends of the leaf springs to bow inwardly such that the inner diameter of the roller at those free ends is smaller than the inner diameter at the root. The degree to which the free ends bow inwardly can be controlled by the size and shape of the gussets and the molding cycle time. Preferably, the face of each gusset is flat and forms an angle of about 45° with the inner surface of the tubular body.

In the roller guide of a Betamax or VHS videotape cassette, the diameter of the roller guide at the free ends of the springs is preferably from 0.1 to 0.3 mm smaller than the diameter at the root. Hence, the novel roller guide may be mounted on a cylindrical pin, the diameter of which is selected such that each of the six leaf springs contacts the pin only at its free end while the root does not contact the pin.

The leaf springs should be strong enough not to break but supple enough to allow the roller guide to rotate easily so that tape drawn across the roller guide does not slip. In the roller guide of a Betamax or VHS videotape cassette having two symmetrical sets of three leaf springs, the radial thickness of each leaf spring should be at least 0.2 mm to have sufficient strength but not more than 0.4 mm to permit free rotation without tape slippage. Circumferentially, each spring should subtend at least 30° of arc to have adequate strength.

Preferably, the inner surface of each leaf spring has substantially the same curvature as the inner surface of the root of the tubular body which in turn approximates that of the pin on which the roller guide is mounted. This provides broad areas of contact between the pin and the free ends of the roller guide. Alternatively, the inner surfaces of the leaf springs may be flat or less curved, but this would reduce the contact area and hence accelerate wear.

THE DRAWING

Figure 1:
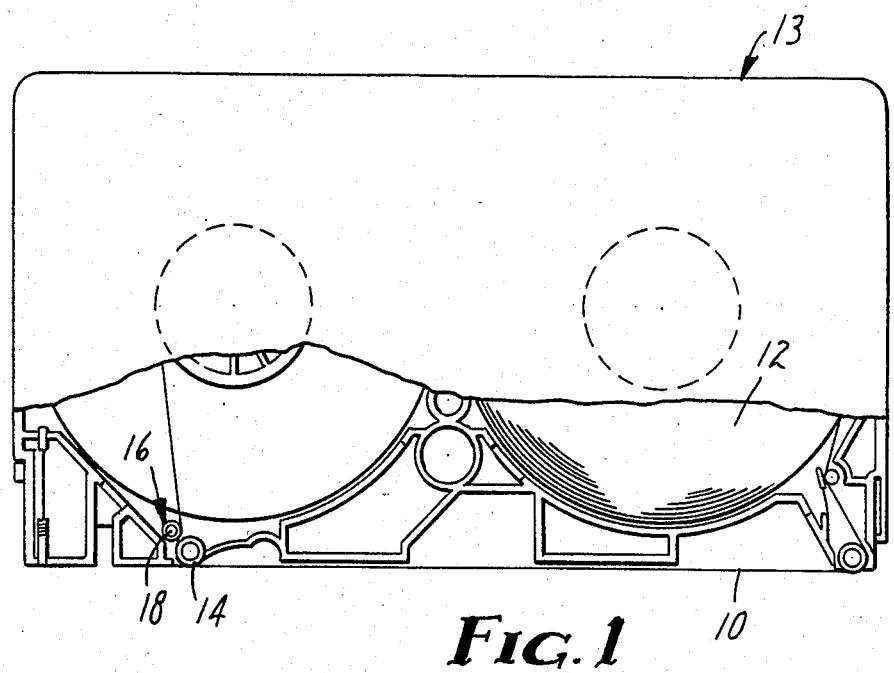
FIG. 1 is a partially cut-away plan view which schematically illustrates the tape path of a VHS videotape cassette and the position of its takeup roller.
Figure 2:
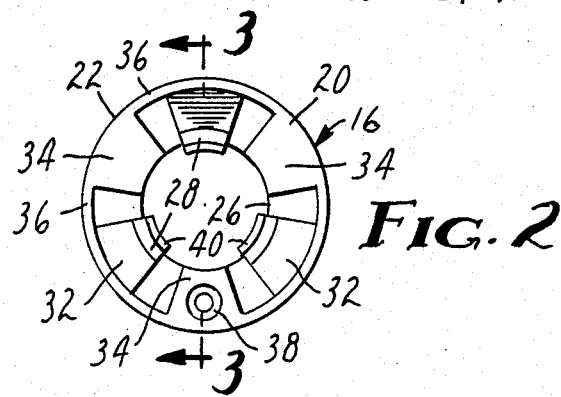
FIG. 2 is an enlarged schematic end view of a roller guide embodying the invention.
Figure 3:
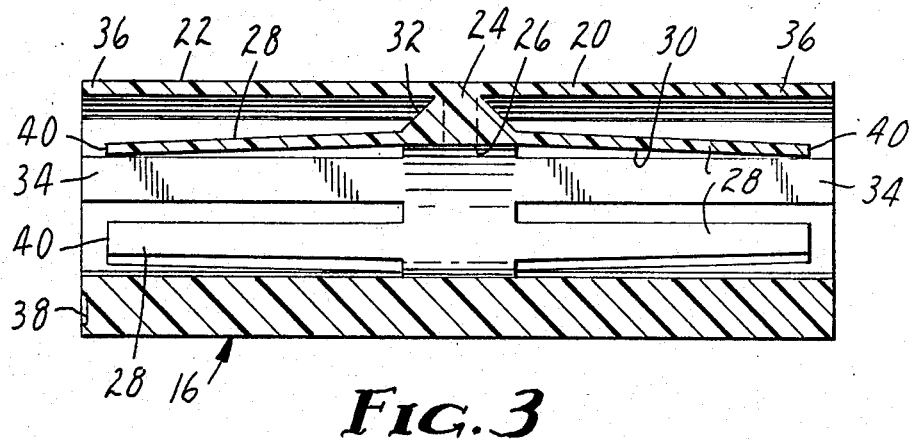
FIG. 3 is a section through line 3—3 of FIG. 2.

Referring first to FIG. 1, magnetic recording tape 10 extends from a supply reel 12 across the front of a VHS videotape cassette 13 to a stainless steel post 14 and a takeup roller which comprises a roller guide 16 rotatably mounted on a cylindrical thermoplastic pin 18 which is press fit into a recess (not shown) in a base of the shell of the cassette 13. As seen in FIGS. 2 and 3, the roller guide 16 comprises a tubular one-piece plastic body 20 having a cylindrical outer surface 22, which body includes a root 24 having a cylindrical inner surface 26. Projecting axially from the root 24 are two symmetrical sets of three leaf springs 28, the inner faces 30 of which conform to and have substantially the same curvature as does the inner surface 26 of the root 24. At the base of each of the leaf springs 28 is a reinforcing gusset which has a flat face 32 that intersects the inner surface of the tubular body 20 at an angle of about 45°.

In the vicinity of the leaf springs 28, the tubular body 20 is formed with lands 34 extending between each adjacent pair of the springs 28 to an inner diameter approximating that of the cylindrical inner surface 26 of the root 24. The lands 34 are interconnected by webs 36 which with the lands 34 and root 24 form the substantially cylindrical outer surface 22 of the tubular body 20. Each land at one end of the body preferably subtends at least 30° of arc so that the lands can be of equal size, with one having adequate area for a gate 38. A depression at the gate insure that roughness at the sprue does not interfere either with positioning of or free rotation of the roller guide 16.

The lands 34 extend beyond the free ends 40 of the springs 28 so that when assembling the roller guide 16 onto the pin 18, it is substantially centered on the pin before the springs contact the pin. The free end of the pin 18 is chamfered (chamfer not shown) to facilitate fitting it into the opening between the lands 34.

EXAMPLE

Using a 2-piece injection mold, the roller guide 16 has been molded of acetal copolymer, specifically "Celcon LW90" of Celanese Plastics & Specialties Co. The nozzle temperature was 190°-200° C., and the cooling water temperature was 70° C. on the cavity side and 10° C. on the ejector side. Molding cycle time was 8 seconds. For venting there was from 5 to 8 micrometers difference between the inner diameter of the mold and the diameter of its cylindrical core pin. The gate was 0.5 mm in diameter. The molded roller guide was mounted without any grease on a pin 18 which had been injection molded using nylon 6/6, (specifically "1000-2" of Celanese Plastics & Specialties Co.). Dimensions were:

| Roller 16 | |
|---|---|
| diameter of outer surface 22 | 5.08 mm |
| inner diameter of root 24 | 2.39 ± 0.01 mm |
| axial length of root at tubular body 20 | 1.0 mm |
| inner diameter at free end of leaf springs 28 | 2.31 ± 0.05 mm |
| length of tubular body 20 | 16.74 mm |
| length of each leaf spring 28 | 7.09 mm |
| radial thickness of each leaf spring 28 | 0.30 mm |
| angle subtended by each leaf spring 28 | 40° |
| angle subtended by each land 34 | 40° |
| Pin 18 diameter | 2.350 ± 0.013 mm |

Average mechanical noise on an ordinary VHS recorder was −52 db in fast forward and −48 db in rewind (average of 3 videocassettes), better in both respects than the −40 db specification which is common in the industry. When retested after 200 cycles of playing and rewinding a full reel of tape, average mechanical noise was −45 db in fast forward, −52 db in rewind.

At the conclusion of this test, these VHS cassettes were held for 5 days in a chamber at 40° C., 80% R.H; then removed from the chamber and immediately retested. Average mechanical noise was then −52 db in fast forward and −49 db in rewind. These cassettes were then subjected to another 200 cycles of fast forward and rewinding. Average mechanical noise was then −48 db in fast forward and −51 db in rewind. These values indicate that plastic flow or creep should not provide any problem in long-term use in spite of environmental changes.

The roller guide 16 has also been molded from another commercial acetal copolymer, namely "Delrin 500CL" of EI duPont, and tested on a nylon 6/6 pin 18 with results comparable to those reported above.

The roller guide 16 also has been molded from nylon 6/6 ("1000-2") and performed well when mounted on an acetal copolymer pin 18 ("Celcon LW90"). However, as compared to nylon, acetal copolymer more readily fills a complex mold cavity and hence is a preferred raw material for the roller guide. Although the pin 18 could be molded of acetal copolymer, nylon is more rigid and hence preferred for the pin. Both acetal copolymer and nylon have excellent resistance to abrasion and low friction in contact with each other.

Using acetal copolymer, a roller guide of this invention has been molded to have only three leaf springs, all projecting symmetrically in one axial direction from the root of the roller, the root extending to the opposite axial extremity of the roller guide. Compared to the diameter of the stainless steel pin on which this roller guide was mounted, the inner diameter of the root was 0.063 mm greater, and the inner diameter of the roller guide at the free ends of the spring was 0.102 mm less. When tested without grease as the takeup roller of a VHS videotape cassette, mechanical noise was not appreciably greater than allowed by the aforementioned specifications.

A roller guide of acetal copolymer essentially as illustrated in FIGS. 2 and 3 of the drawing has been tested without grease on a molded plastic pin as the takeup roller of a Betamax videotape cassette, performing well at mechanical noise levels below typical specifications.

While testing has thus far been in videotape cassettes, the roller of the invention should be useful in other types of tape magazines including audiotape cassettes and cartridges.

I claim:

1. One-piece plastic roller guide comprising a tubular body having a substantially cylindrical outer surface, said body including a root from which at least one leaf spring projects in an axial direction such that the inner diameter of the roller guide at the free end of the leaf spring is smaller than its inner diameter at the root, said body being formed in the vicinity of the at least one leaf spring with a plurality of lands wherein each of the lands extends adjacent the at least one leaf spring to an inner diameter approximating that of the root, webs interconnecting the lands and with which the lands and root form the substantially cylindrical outer surface of the tubular body.

2. Roller guide as defined in claim 1 wherein the root has a substantially cylindrical inner surface which is coaxial with the substantially cylindrical outer surface of the tubular body.

3. Roller guide as defined in claim 2 wherein the inner face of the leaf spring conforms to and has substantially the same curvature as the inner surface of the root.

4. Roller guide as defined in claim 3 wherein said one leaf spring and two additional leaf springs project symmetrically from the root in said axial direction.

5. Roller guide as defined in claim 4, the tubular body of which in the vicinity of the leaf springs is formed with three lands, each extending between adjacent leaf springs to an inner diameter approximating that of the root.

6. Roller guide as defined in claim 5 wherein said lands extend axially beyond the free ends of the springs so that when assembling the roller onto a cylindrical pin, it is substantially centered on the pin before the springs contact the pin.

7. Roller guide as defined in claim 5 having a substantially identical set of three leaf springs projecting from the root in the opposite axial direction.

8. Roller guide as defined in claim 7 wherein the lands are of equal size and each subtends at least 30° of arc.

9. Roller guide as defined in claim 7 including a reinforcing gusset at the base of each leaf spring.

10. Roller guide as defined in claim 9 wherein the face of each reinforcing gusset is flat and forms an angle of about 45° with the inner surface of the tubular body.

11. Roller guide as defined in claim 1 having at least a second spring projecting from the root in the opposite axial direction.

12. Roller guide as defined in claim 1 wherein the plastic is acetal copolymer.

13. A roller guide assembly comprising a one-piece plastic roller guide carried on a stationary cylindrical pin, the roller guide comprising a tubular body having a substantially cylindrical outer surface, said body including a root from which at least one leaf spring projects in an axial direction such that the inner diameter of the roller guide at the free end of the leaf spring is smaller than its inner diameter at the root said body being formed in the vicinity of the at least one leaf spring with a plurality of lands wherein each of the lands extends adjacent the at least one leaf spring to an inner diameter approximating that of the root, webs interconnecting the lands and with which the lands and root form the substantially cylindrical outer surface of the tubular body, the diameter of the pin being smaller than the inner diameter of the roller guide at the root and slightly greater than the inner diameter of the roller guide at the free end of the at least one leaf spring when the roller guide is removed from the pin.

14. A roller guide assembly as defined in claim 13 wherein said pin is nylon and said roller guide is acetal copolymer.

15. A roller guide assembly comprising a one-piece plastic roller guide carried on a stationary, molded, cylindrical thermoplastic pin, the roller guide comprising a tubular body having a substantially cylindrical outer surface, the body including a root having a substantially cylindrical inner surface which is coaxial with the substantially cylindrical outer surface of the tubular body, three leaf springs projecting symmetrically from the root in the axial direction and a substantially identical set of three leaf springs projecting from the root in the opposite axial direction such that the inner diameter of the roller guide at the free end of the leaf springs is smaller than the inner diameter at the root, the body being formed in the vicinity of the leaf springs with three lands, each extending between adjacent leaf springs to an inner diameter approximating that of the root, webs interconnecting the lands and with which the lands and root form the substantially cylindrical outer surface of the tubular body and wherein the inner face of the leaf springs conform to and have substantially the same curvature as the inner surface of the root, the roller guide contacting the pin only at the free ends of the six leaf springs.

16. A roller guide assembly as defined in claim 15 wherein the diameter of the pin is about 2.5 mm, and the inner diameter of the roller guide at the free ends of each set of leaf springs is 0.05–0.15 mm less than the diameter of the pin when the roller guide is removed from the pin.

* * * * *